United States Patent
Neumann et al.

(10) Patent No.: US 11,668,626 B2
(45) Date of Patent: Jun. 6, 2023

(54) SPIN-SET BEARING SETTING VERIFICATION METHOD

(71) Applicant: Deere & Company, Moline, IL (US)

(72) Inventors: Clayton P. Neumann, Cedar Falls, IA (US); Kevin R. King, Waterloo, IA (US)

(73) Assignee: Deere & Company, Moline, IL (US)

(*) Notice: Subject to any disclaimer, the term of this patent is extended or adjusted under 35 U.S.C. 154(b) by 240 days.

(21) Appl. No.: 17/141,545

(22) Filed: Jan. 5, 2021

(65) Prior Publication Data
US 2021/0364044 A1    Nov. 25, 2021

Related U.S. Application Data

(60) Provisional application No. 63/028,651, filed on May 22, 2020.

(51) Int. Cl.
| | | |
|---|---|---|
| *G01M 13/04* | (2019.01) | |
| *F16C 43/04* | (2006.01) | |
| *F16C 25/08* | (2006.01) | |
| *F16C 35/067* | (2006.01) | |

(52) U.S. Cl.
CPC .......... *G01M 13/04* (2013.01); *F16C 25/08* (2013.01); *F16C 35/067* (2013.01); *F16C 43/04* (2013.01)

(58) Field of Classification Search
CPC ....... G01M 13/04; F16C 25/08; F16C 35/067; F16C 43/04; F16C 19/548; F16C 2229/00; F16C 2361/65; F16C 25/06
See application file for complete search history.

(56) References Cited

U.S. PATENT DOCUMENTS

| | | | |
|---|---|---|---|
| 8,740,523 B2 * | 6/2014 | Nakashima | F16C 25/06 409/207 |
| 9,891,136 B2 | 2/2018 | Brownell et al. | |
| 2015/0052758 A1 * | 2/2015 | Katsaros | F16C 19/386 29/898.09 |
| 2017/0067796 A1 * | 3/2017 | Kawada | F16C 33/6637 |

FOREIGN PATENT DOCUMENTS

| | | |
|---|---|---|
| DE | 102016218393 A1 | 3/2017 |
| DE | 102018215858 A1 | 4/2019 |
| JP | 201292910 A | 5/2012 |

OTHER PUBLICATIONS

Springer et al., "Setting techniques for tapered roller bearings," MachinDesign.com [Online], Jun. 1, 2020, Retrieved from Internet on Dec. 31, 2020, 8 pages, <https://www.machinedesign.com/motors-drives/article/21831685/setting-techniques-for-tapered-roller-bearings>.
German Search Report issued in application No. DE102021203933. 2, dated Feb. 14, 2022, 5 pages.

\* cited by examiner

*Primary Examiner* — Alexander A Mercado
(74) *Attorney, Agent, or Firm* — Tucker Ellis LLP; Heather M. Barnes; Michael G. Craig

(57) ABSTRACT

A method for spin set bearing setting verification in a preload state on a shaft. An inertia wheel may be disposed on the shaft. The inertia wheel or the shaft is rotated. A first rotational speed is measured at a first time. The inertia wheel may decelerate over time to achieve a second rotational speed measured at a second time. The second speed is less than first speed. The change in time between the first time and the second time is measured. The bearing setting may be adjusted if the change in time is outside a predetermined time range. The bearing setting may remain unchanged if the change in time is within a predetermined time range.

19 Claims, 10 Drawing Sheets

SPIN-SET BEARING SETTING VERIFICATION METHOD

CROSS-REFERENCE TO RELATED APPLICATION(S)

This application claims priority to U.S. Ser. No. 63/028,651, entitled SPIN-SET BEARING SETTING VERIFICATION METHOD, filed May 22, 2020, which is incorporated herein by reference.

BACKGROUND

Angular contact bearings are set in pairs under small amounts of dimensional endplay or preload to achieve expected service life. Once the bearings setting is completed, it is advisable to verify the proper setting has been achieved. Endplay can be verified relatively easily by pushing and pulling on the assembly and measuring the movement with an indicator. Pre-load requires a measurement of the rolling drag increase in the system. This can be very challenging to detect in high efficiency or low drag bearings sets and often requires expensive specialized machinery. There is a need in the art to provide an inexpensive and simple method to verify spin-set bearings.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A method for spin set bearing setting verification in a preload state on a shaft may comprise use of an inertia wheel disposed on a shaft of a vehicle transmission. The inertia wheel or the shaft is rotated. A first rotational speed is measured at a first time. The inertia wheel may decelerate over time to achieve a second rotational speed measured at a second time. The second speed is less than first speed. The change in time between the first time and the second time is measured. The bearing setting may be changed if the change in time is outside a predetermined time range.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIG. 2A is a bottom view taken along line 2A-2A of FIG. 2.

Figure 1:
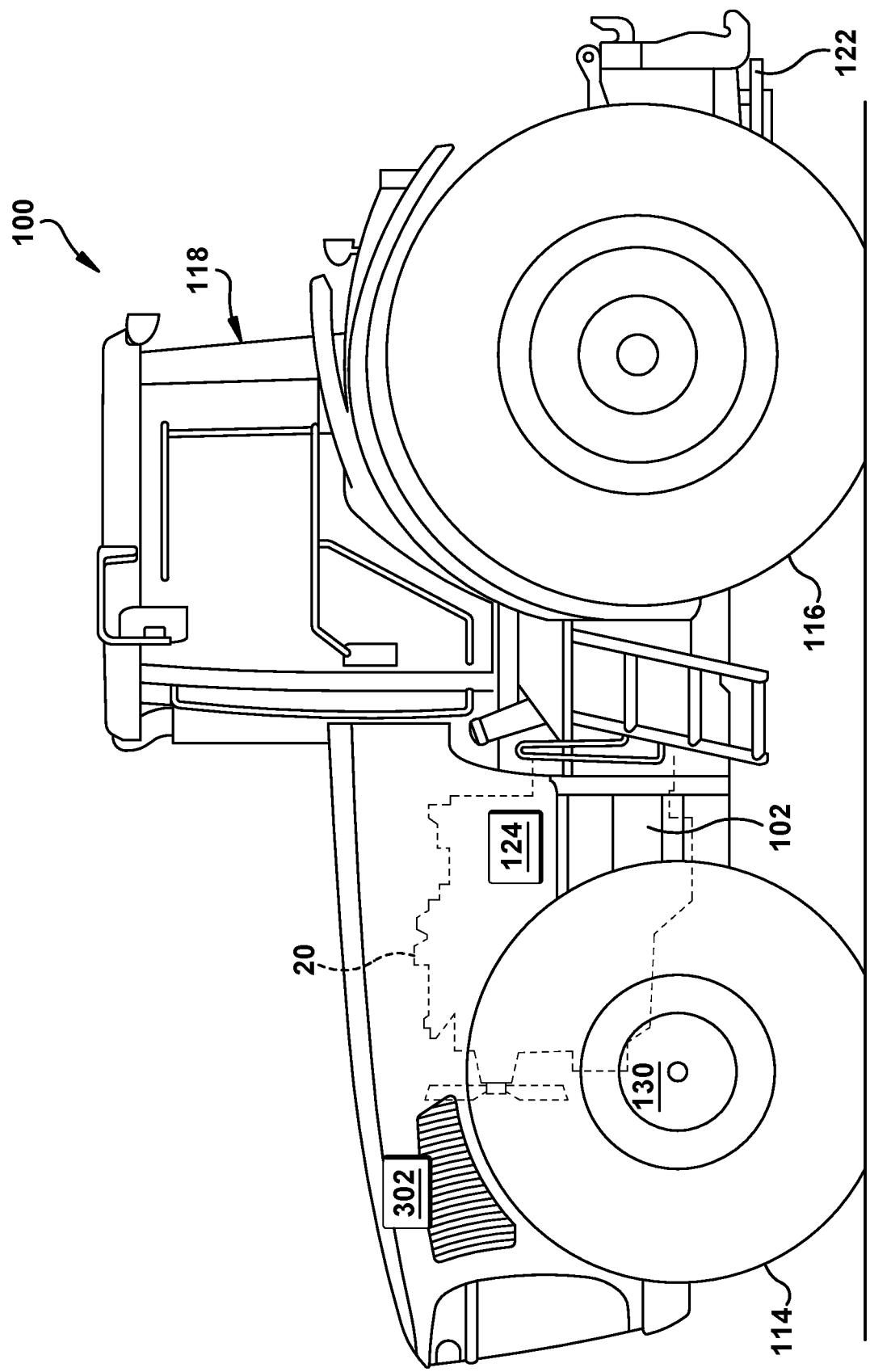
FIG. 1 is a component diagram which may be used in one example implementation of the method described herein.

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a vehicle 100, including without limitation an agricultural vehicle such as a tractor, is shown. The vehicle 100 may include a frame 102, front tires 114, rear tires 116, a vehicle cab 118, an engine 120, and a pick-up hitch 122. The vehicle 100 may be any vehicle such as an automobile, bus, van, truck, or sports utility vehicle. In other implementations, the vehicle may be any agricultural vehicle, including without limitation a tractor, all-terrain vehicle, utility terrain vehicle, backhoes, and front end loaders, for example.

The engine 120 further comprises a transmission 124 that may have a housing 124. A first shaft 126 may be configured to be coupled to and driven by the engine 120 or other source of rotational power. The transmission 124 may also have a second shaft 128 operably coupled with the front wheels 130 and/or rear wheels 132. It should be understood that the method described herein can be applied to any shaft of the transmission 124.

Bearings 200 may be used to support the first shaft 126 and the second shaft 128 of the transmission 124. Such bearings may be tapered rolling bearings or angular contact bearings. Throughout, tapered rolling bearings and angular contact bearings may be used interchangeably. The first shaft 126 may rotate extremely fast, for example, at 10,000 revolutions per minute. At such high rotational speeds, tapered roller bearings or angular contact bearings may be resistant to high speeds or being accelerated at high rates. In order to prevent bearing cages from failing or being moved an undesirable amount, it may be advantageous to set the bearings 200 in a preload condition and not an endplay condition.

Endplay may be the total distance the first shaft 126 or second shaft 128 can move between the bearing set. This may also be referred to as float, thrust bearing clearance or axial clearance. The axial clearance between rollers and races producing a measurable axial shaft movement when a small axial force is applied. The axial force may be applied first in one direction and then in the other, while oscillating or rotating the shaft.

Preload may be the process of adding a sustained axial load, independent of external loads to the bearings. Properly preloading the bearing can increase its life and eliminate the vibration and noise that results from specific clearance, manufacturing precision, and wear. In other words, preload may be the axial interference between rollers and races such that there is no discernable axial shaft movement when measured as described with endplay. Sometimes this is referred to as a negative clearance. A rolling resistance to shaft rotation results, which may be measurable. Both proper preload or endplay may help keep bearings working correctly to reduce bearing failure and help prevent misalignment.

Rolling drag, which may also be known as rolling resistance or rolling friction may be the force resisting motion when a body, such as a ball, tire, wheel) rolls on a surface. In one implementation, the method described herein may be utilized when the shaft 126, 128 is free of seals, seal rings, or other components on the shaft. If multiple components are present on the shaft other than the bearings, data may become more cumbersome to calculate because differentiation between rolling drag from the bearings or the components may be difficult to decipher. In other implementations, calculations may be made to account for additional components on the shaft.

With reference to FIGS. 2-5, tapered rolling bearings 210 work in pairs. Bearing setting is the methodology utilized to properly position the bearings 200 on the first shaft 126 or second shaft 128. The method for ensuring proper placement of the bearings 200, 210 may comprise measurement of rolling drag of the bearings. In one implementation, the bearings 200, 210 may be small. In a nonlimiting example, a bearing bore may be about 50 mm. In another implementation, the bearing bore may range from about 30 mm to about 70 mm. As such, the preload may be light. Known methods of measuring the rolling drag are ineffective because the rolling drag is so low, it may not be measured with torque meters.

With continuing reference to FIGS. 2-5, the bearings 200, 210 may be positioned on the first shaft 126 or the second shaft 128. The first shaft 126 may have a first end 126a, which may be inserted into the housing 125. A second end 126b may be oppositely disposed from the first end 126a. The second end 126b may be a drive end comprising an enlarged cylindrical shape 212 comprising splines 216. The second shaft 128 may have a first end 128a, which may be inserted into the transmission housing 125. A second end 128b may be oppositely disposed from the first end 128a. The second end 128b may be a drive end comprising an enlarged cylindrical shape 214 comprising splines 216.

With continued reference to FIGS. 2-5, 7A and 7B, an example of an inertia wheel 230 is shown. The inertia wheel 230 may comprise a diameter D. The inertia wheel 230 may also comprise a hub 232. The inertia wheel hub 232 may be configured to engage with the splines 216 of the cylindrically shaped drive end 212, 214 of each shaft 126, 128. In one nonlimiting implementation, the diameter D may range from about eight inches to about fourteen inches. In another example, the diameter D of the inertia wheel 230 may be about ten inches. In yet another implementation, the diameter D of the inertia wheel 230 may be about twelve inches. By way of example, the weight of the inertial wheel may be such to avoid the need for utilizing a hoist to position the inertia wheel 230 on either the first shaft 126 or the second shaft 128. In one nonlimiting example, the inertia wheel 230 may weigh between fifteen and thirty pounds. In another example, the inertia wheel may weight twenty pounds. In another example, the inertia wheel may weigh twenty-five pounds.

Figure 2:
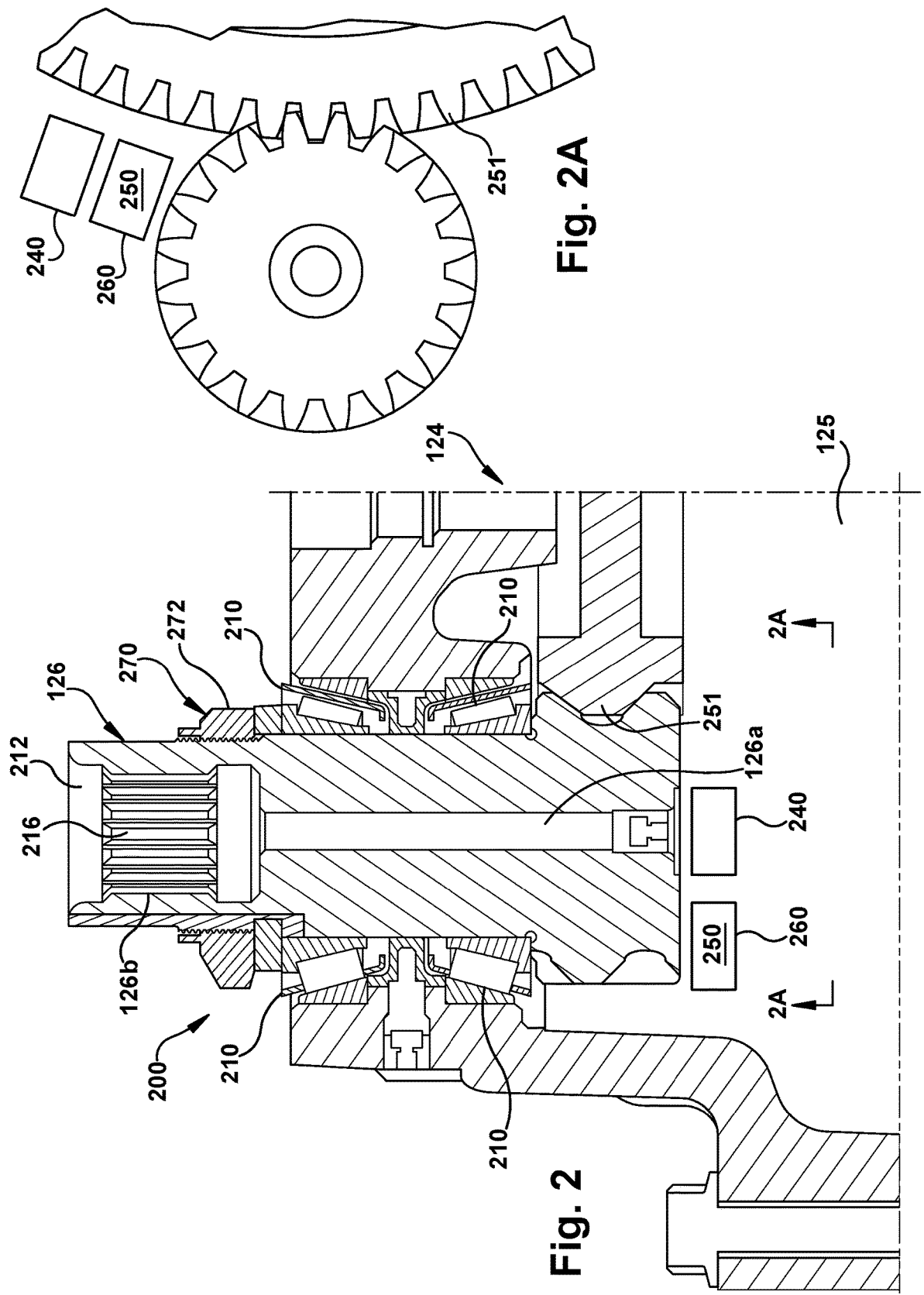
FIG. 2 is a front elevational view of a component of one implementation of the method described herein.
Figure 3:
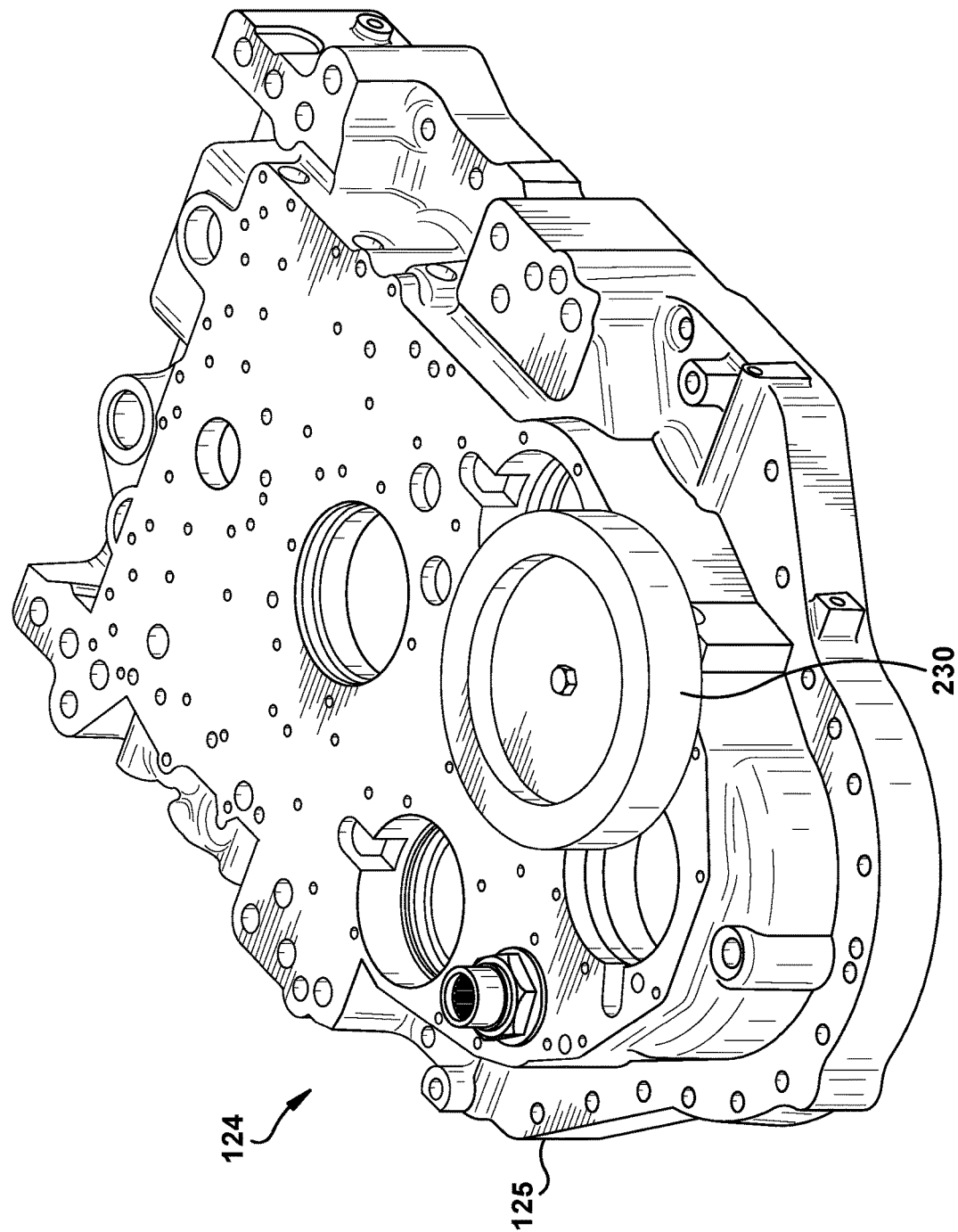
FIG. 3 is a perspective view of a component of another implementation of the method described herein.
Figure 4:
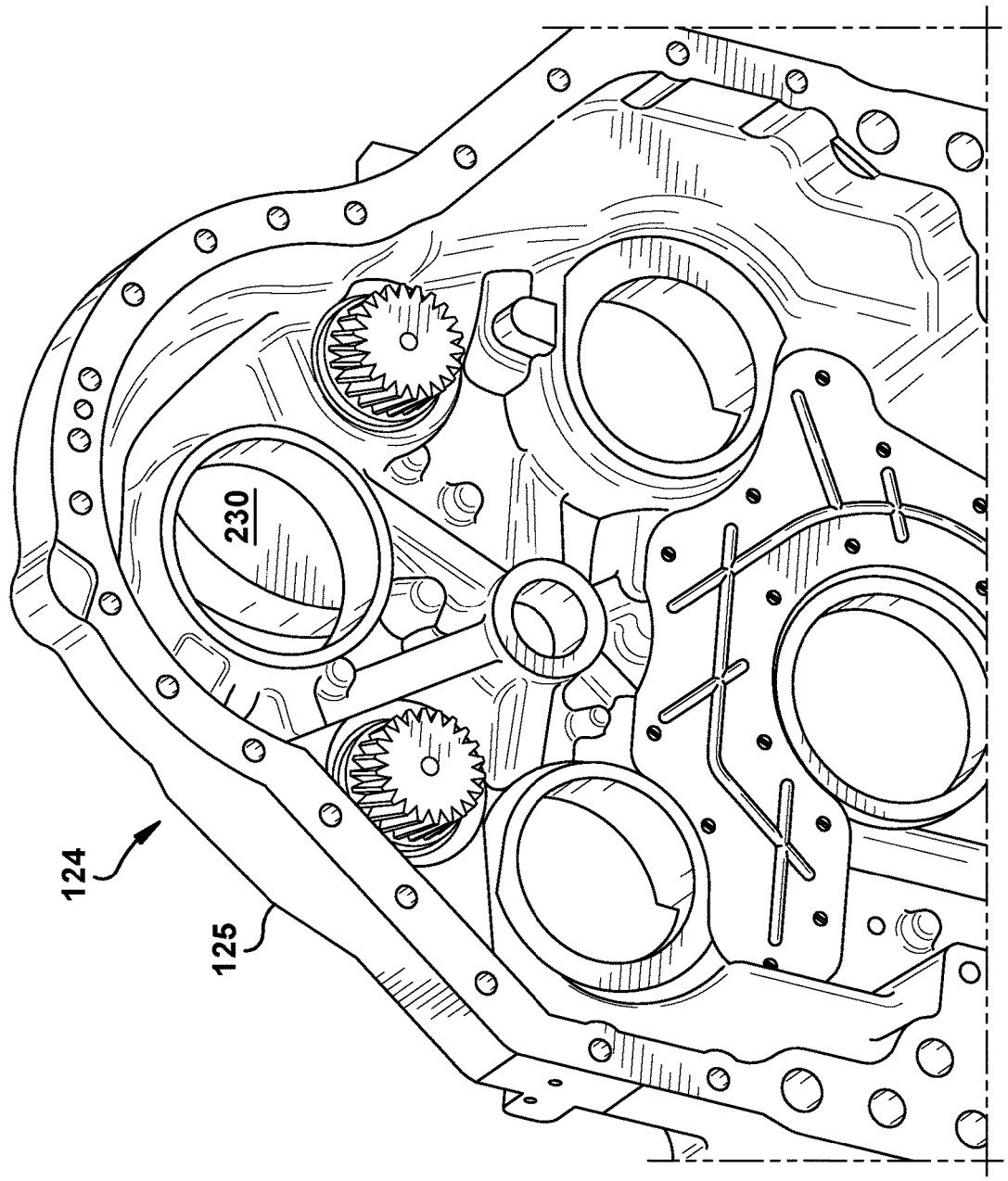
FIG. 4 is another perspective view of a component of another implementation of the method described herein.
Figure 5:
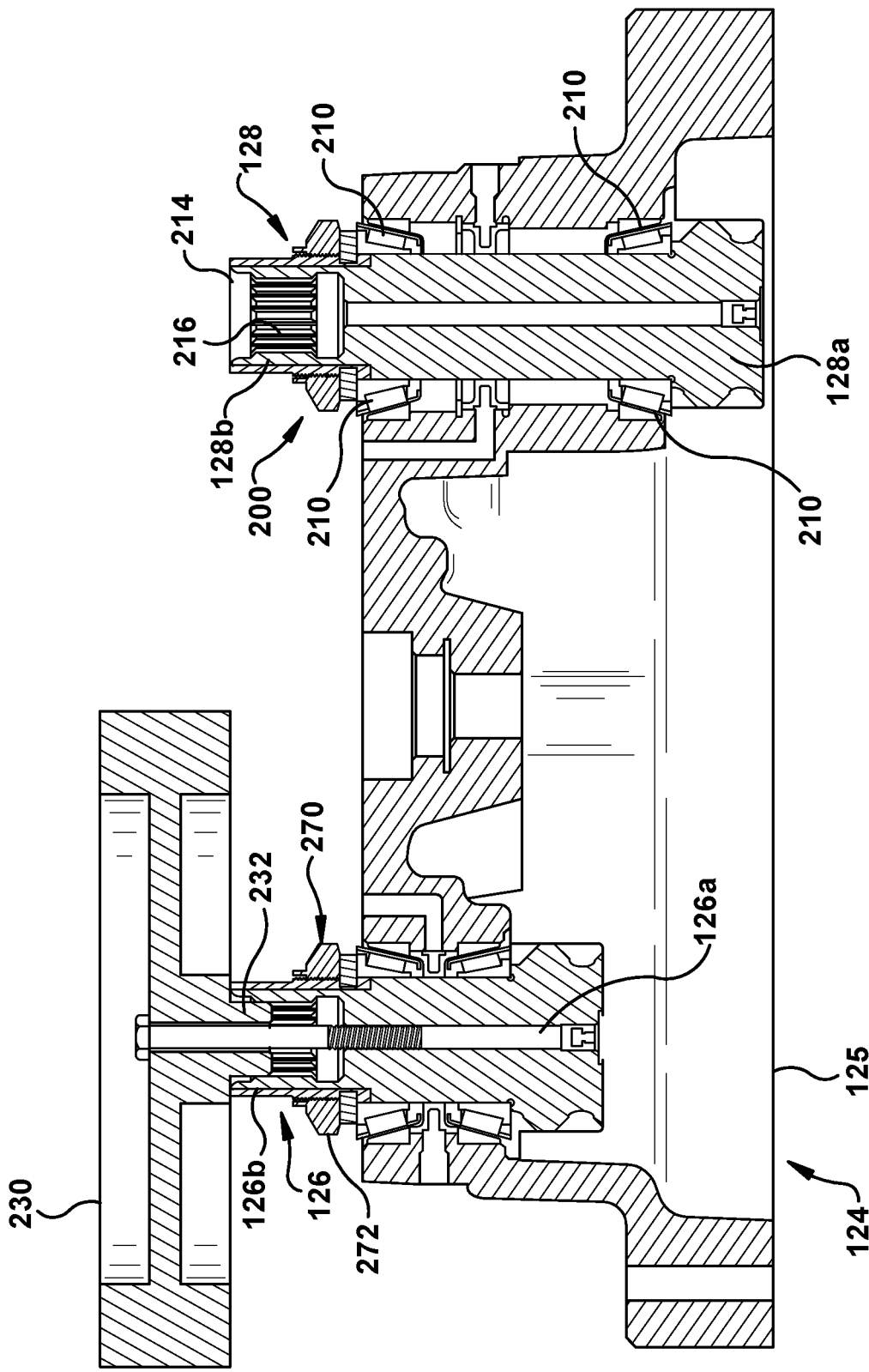
FIG. 5 is another front elevational view of a component of another implementation of the method described herein.

With reference to FIGS. 2 and 2A, a speed sensor 240 may be operably connected to a speed sensor target component 250 in relation to the transmission 124. The speed sensor target component 250 may be in any location chosen with sound engineering judgment. For example, the speed sensor target component 250 may be one or more of the inertia wheel 230, a gear 260 (gear body or gear tooth) positioned near the first end 126a, 128a of the first shaft 126 or the second shaft 128, or somewhere on the transmission housing 125. In one implementation, the speed sensor 240 may be configured to read gear teeth 251 in the orientation shown in FIG. 2. In another implementation, the speed sensor 240 may be a magnetic pickup that senses the change between the gear teeth 251 and the space between the gear teeth 251.

With continuing reference to FIGS. 2-5, an adjustment body 270 may be utilized to tighten or loosen bearing 200 on the shaft 126, 128. The adjustment body 270 by tightening or loosening on the second end of the shaft 126b, 128b changes the bearing setting from an endplay state to a preload state. If the adjustment body 270 is too tight, the bearing setting may be too tight, which may lead to excessive temperatures during shaft rotation during use. If the adjustment body 270 is too loose, the bearing setting may be in the endplay state. In one nonlimiting implementation, the adjustment body 270 may be an adjustment nut 272.

Figure 6A:
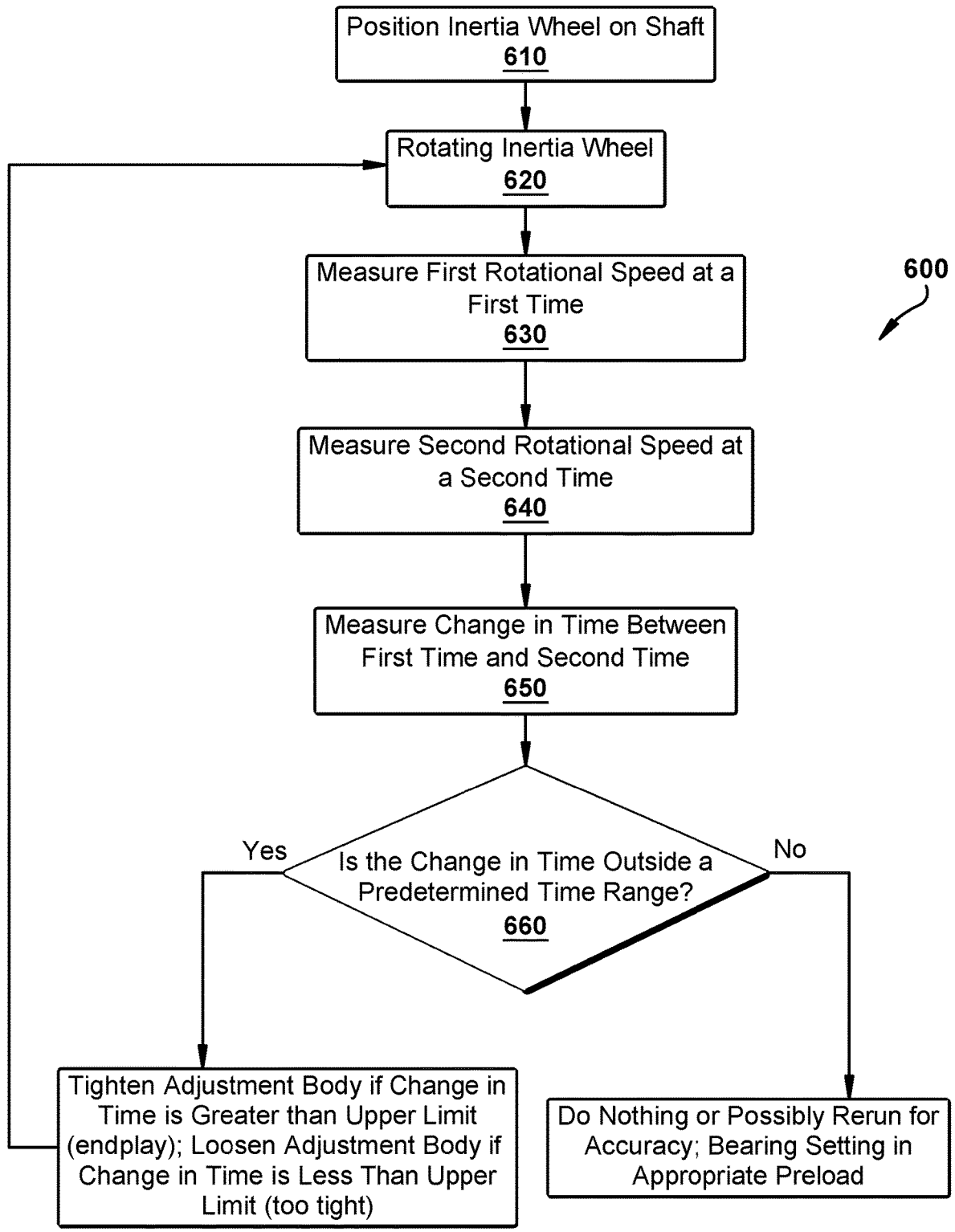
FIG. 6A is a flow chart showing one implementation of the method described herein.

With reference to FIG. 6A, a method for spin set bearing position verification in a preload state on a shaft 600. In one implementation, the method may be utilized to measure rolling drag experienced by the bearings 200, 210. The inertia wheel 230 may be disposed on the shaft 126, 128, 610. The inertia wheel 230 or the shaft 126, 128 is rotated 620. Rotation may occur by hand or with a tool. A first rotational speed (i.e. velocity) is measured at a first time 630. The inertia wheel 230 may decelerate over time to achieve a second rotational speed measured at a second time 640. The second rotational speed is less than first rotational speed. The change in time between the first time and the second time may be measured 650. The bearing setting may be changed if the change in time is outside a predetermined time range 660. The predetermined time range may have an upper limit and a lower limit. If the change in time is above the upper limit, this is an indication that the bearing setting is in endplay, and the adjustment body 270 should be tightened and then the process is repeated. If the change in time is below the lower limit, the bearing setting is too tight, and the adjustment body 270 should be loosened. If the change in time is within the predetermined range, this may indicate appropriate preload for the bearing setting and the verification process may be considered complete. In one implementation, if the change in time is within the predetermined range, the steps of rotating the inertia wheel from a first rotational speed to a second rotational speed may be repeated for accuracy of the change in time. This process may be repeated any number of times desired to ensure the accuracy of the change in time being within the predetermined range. In another implementation, the process may be repeated and the adjustment body tightened or loosened until the change in time is within the predetermined range. Each process of measuring the difference between the first time associated with the first rotational speed and the second time associated with the second rotational speed may be considered a run. In one implementation, each run may be of a relatively short duration. For example, one run may take about thirty seconds to obtain the change in speed data.

Figure 6B:
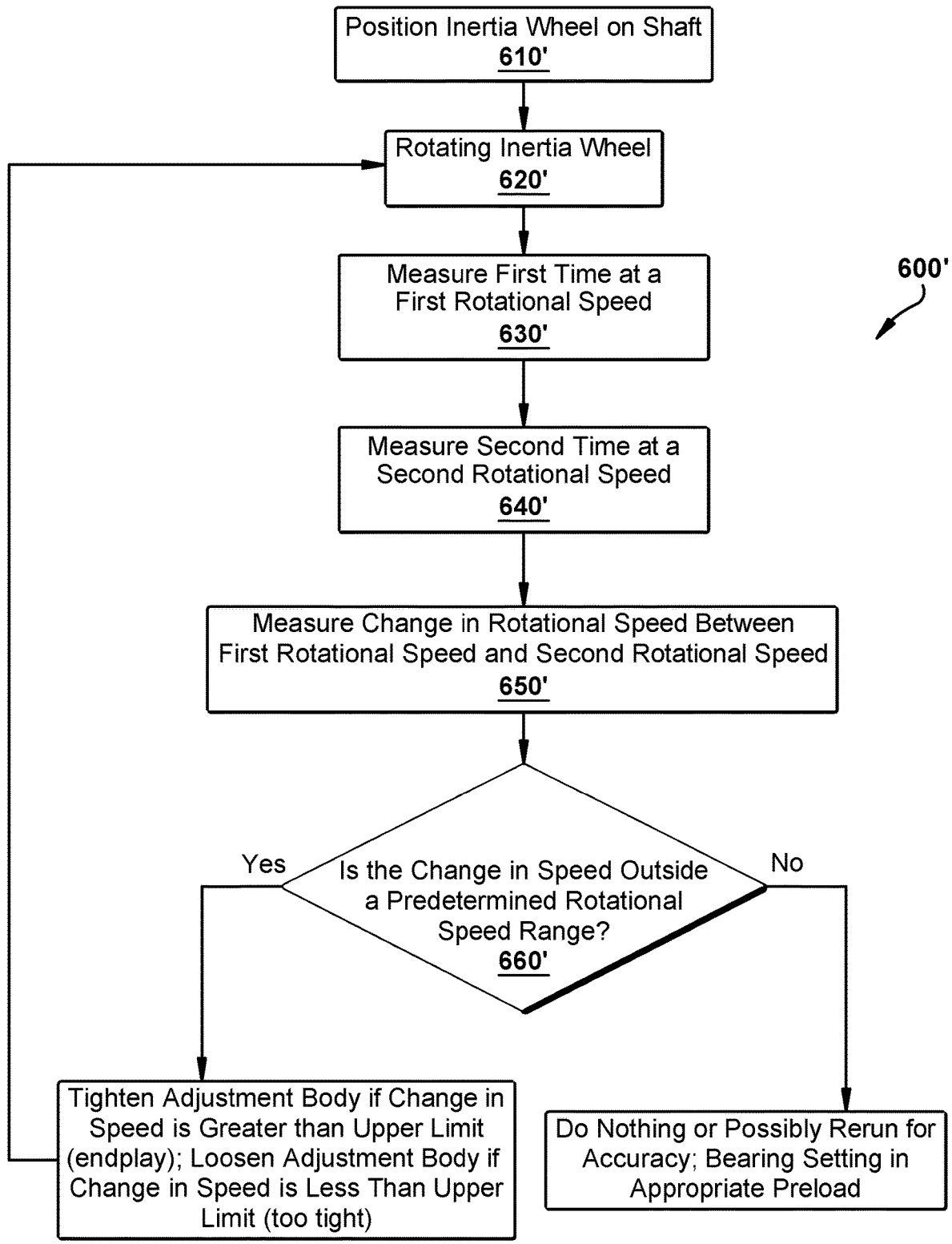
FIG. 6B is a flow chart showing another implementation of the method described herein.
Figure 7B:
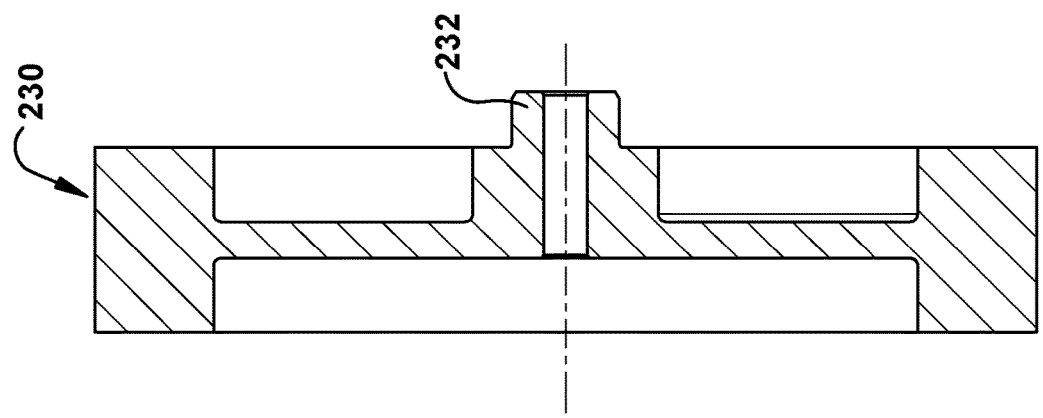
FIG. 7B is a cross-section view taken along line A-A of FIG. 6A.
Figure 7A:
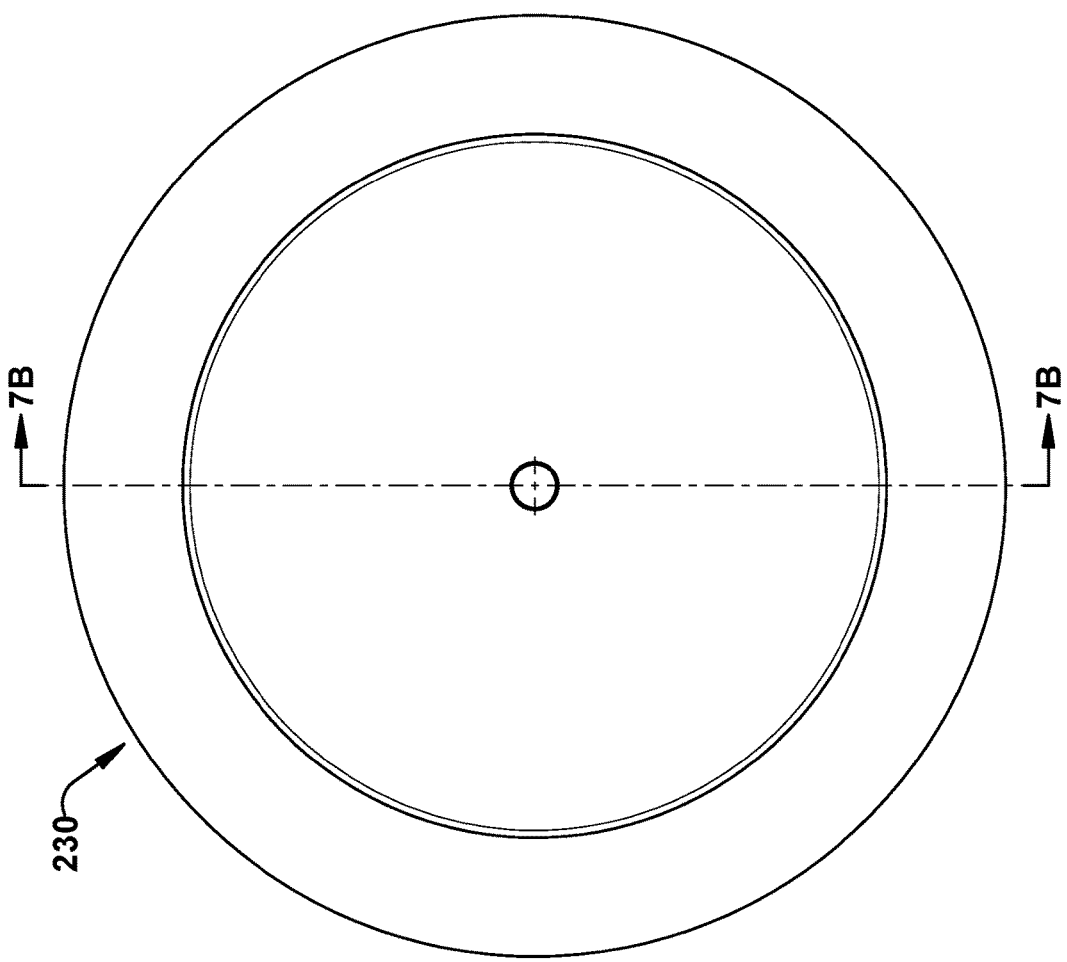
FIG. 7A is a top view of a component utilized with the method described herein.
Figure 8:
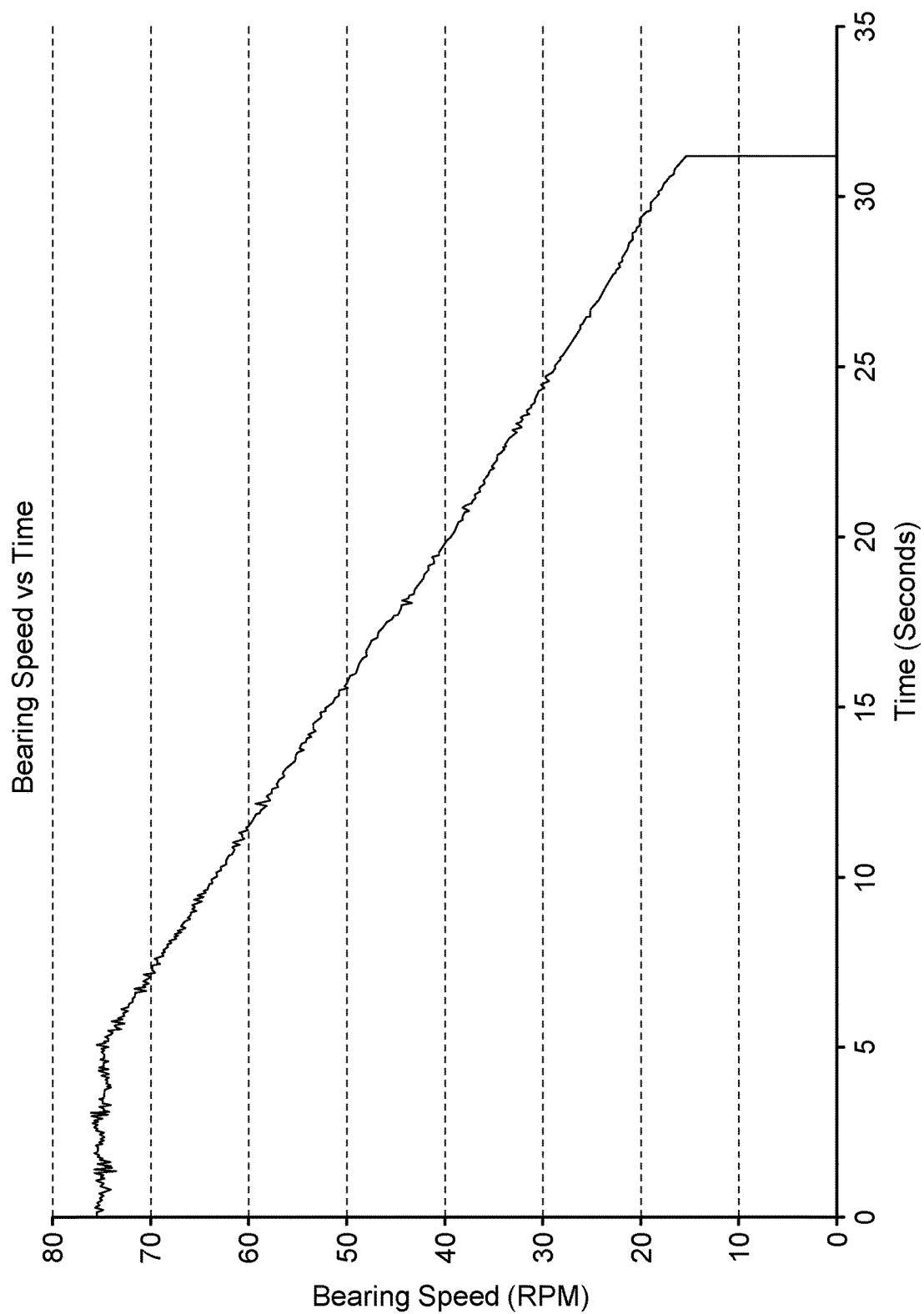
FIG. 8 is a data chart utilizing the method described herein.

With reference to FIG. 6B, a method for spin set bearing position verification in a preload state on a shaft 600'. In this implementation, the speed at two preset time values may be measured and then measure the change in speed rather than the change in time (described above an in FIG. 6A). In one implementation, the method may be utilized to measure rolling drag experienced by the bearings 200, 210. The inertia wheel 230 may be disposed on the shaft 126, 128, 610'. The inertia wheel 230 or the shaft 126, 128 is rotated 620'. Rotation may occur by hand or with a tool. A first time value may be measured at a first rotational speed 630'. The inertia wheel 230 may decelerate over time to achieve a second rotational speed measured at a second time value 640'. The second rotational speed is less than first rotational speed. The change in speed (i.e. velocity) between the first time value and the second time value may be measured 650'. The bearing setting may be changed if the change in speed is outside a predetermined speed range 660'. The predetermined speed range may have an upper limit and a lower limit. If the change in speed is above the upper limit, this is an indication that the bearing setting is in endplay, and the adjustment body 270 should be tightened and then the process is repeated. If the change in speed is below the lower limit, the bearing setting is too tight, and the adjustment body 270 should be loosened. If the change in speed is within the predetermined range, this may indicate appropriate preload for the bearing setting and the verification process may be considered complete. In one implementation, if the change in speed is within the predetermined range, the steps of rotating the inertia wheel from a first time value to a second time value may be repeated for accuracy of the change in speed. This process may be repeated any number of times desired to ensure the accuracy of the change in speed being within the predetermined range. In another implementation, the process may be repeated and the adjustment body tightened or loosened until the change in speed is within the predetermined range. Each process of measuring the difference between the first speed associated with the first time value and the second speed associated with the second time value may be considered a run. In one implementation, each run may be of a relatively short duration. For example, one run may take about thirty seconds to obtain the change in speed data. It should also be understood that while rotational speed is referenced, other measured speed may be utilized such as linear speed if appropriate.

In one implementation, the step of rotating the inertia wheel 230 or the shaft 126, 128 may comprise rotating the inertial wheel or shaft to a rotational speed greater than the first rotational speed. In one implementation, the second rotational speed may be measured prior to the time the speed sensor is unable to detect the rotational speed. With reference to FIG. 7, one nonlimiting example of a data representation of bearing speed over time is illustrated. Bearing speed (which may be the same as the rotational speed of the inertia wheel and shaft) may start, for example around 75 rpm and the speed sensor senses the speed until about 20 rpm, at which time the rotation is too slow for the speed sensor to sense the bearing speed. In such nonlimiting example, the first time may be taken at a first rotational speed of about 70 rpm. The second time may be taken at a second rotational speed of about 30 rpm. By taking speed measurements and time measurements after the inertial wheel begins to spin and before it stops, it is believed to alleviate any measurement error.

The predetermined time range may vary depending upon the spin set bearing application and system. As parameters change, the predetermined time range for determining an appropriate preload state for the bearing setting may also change. By way of nonlimiting example, the following is an example of runs that may be considered to determine if bearings 200, 210 are within specification of an appropriate preload state. The bearings 200, 210 may be positioned on the shaft 126, 128. The adjustment body 270, such as the adjustment nut 272, may be tightened on the second end 126b, 128b of the shaft 126, 128 to 40 Newton-meters. In this example a change in time between the first time and the second time of between about two seconds to about eight seconds may be the acceptable change in time range. The inertia wheel is positioned on the shaft and rotated. The first rotational speed is measured at the first time and the second rotational speed is measured at the second time. If the change in time is greater than eight seconds, the bearing setting is in endplay and the adjustment nut 272 may be tightened. The inertia wheel is rotated again, and if the change in time is less than two seconds, the bearing setting is too tight and the adjustment nut 272 should be loosened. This process is repeated until the change in time reaches between two to eight seconds. In one implementation, the adjustment nut 272 may have a known pitch, so a projection can be made of how to twist the nut to place the spin set bearing in preload. In one implementation, five degrees may be correlated to about 25 microns of axial adjustment. In another example implementation, axial adjustment may range between 25-50 microns, which may, which is about 5 seconds in change of time between the first rotational speed and the second rotational speed. In one implementation, adjustment nut 272 threads are very fine, and as such, only a small rotation angle may be required to place the bearing setting in the desired preload state.

Figure 9:
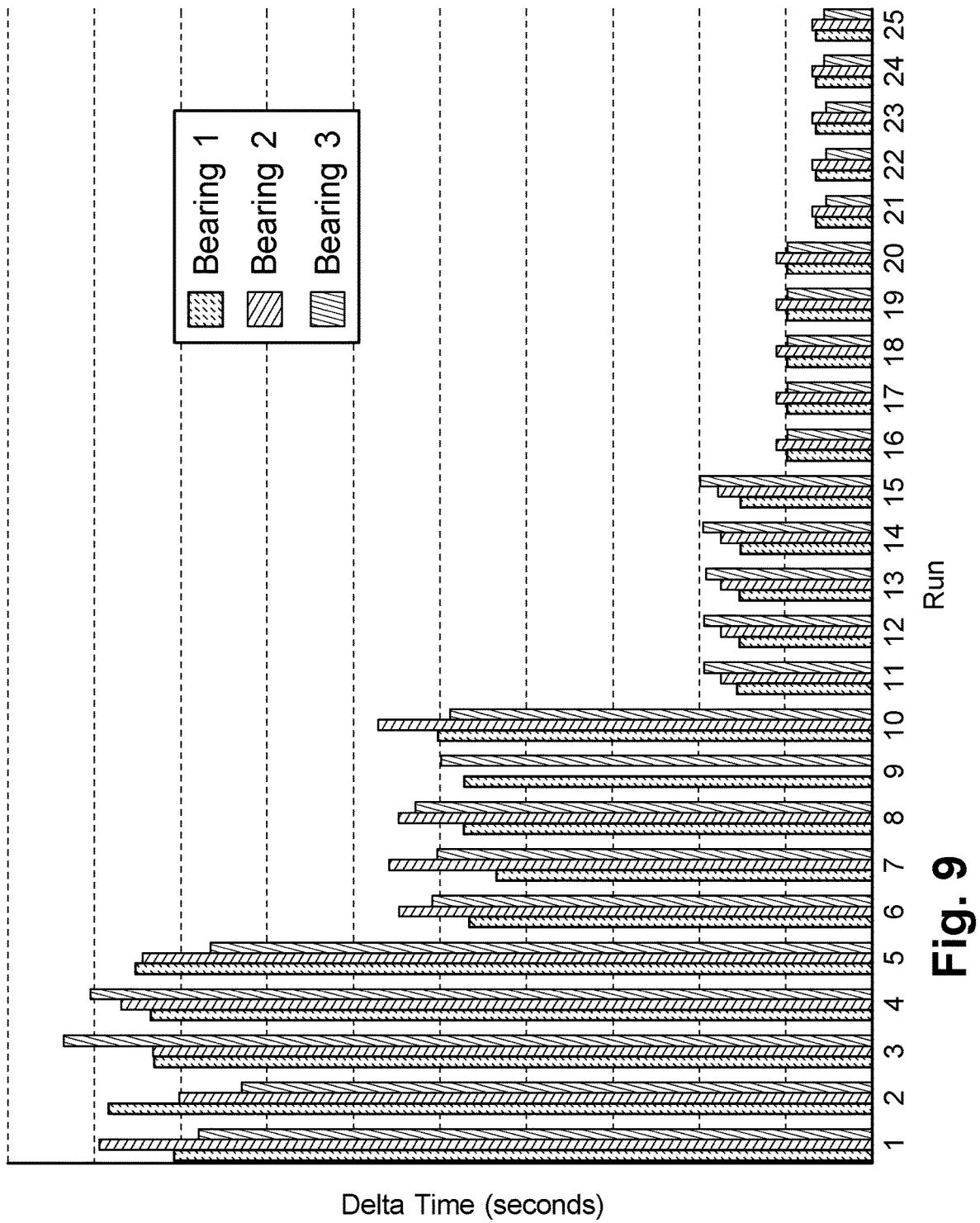
FIG. 9 is a data chart utilizing the method described herein.

With reference to FIG. 9, an example of data of time versus runs is exemplified. The change in time between the first rotational speed and the second rotational speed is shown along the vertical axis. The number of runs is shown along the horizontal axis. As shown in FIG. 9, each run comprises three spin set bearings. Runs 1-5 is an example of the change in time between the first rotational speed and the second rotational speed being above the upper limit of the predetermine time range, meaning the bearing setting is in endplay. Runs 6-10 exemplify tightening of the adjustment nut 272 to achieve appropriate preload. Runs 6-10 exemplify that the change in time between the first rotational speed and the second rotational speed still being above the upper limit of the predetermine time range, meaning the bearing setting is in endplay. The endplay of runs 6-10 is less than the amount of endplay present in runs 1-5. In this example the adjustment nut may be tightened again to achieve appropriate preload for the bearings. Runs 11-15 show the change in time between the first rotational speed and the second rotational speed being within the predetermined time range, and as such, the bearings are considered to be in the appropriate preload state. The adjustment nut 272 would not need to be further adjusted. Runs 16-20 show the change in time between the first rotational speed and the second rotational speed being within the predetermined time range, and as such, the bearings are considered to be in the appropriate preload state. The adjustment nut 272 would not need to be further adjusted. Runs 21-25 illustrate the change in time between the first rotational speed and the second rotational speed being below the lower limit of the predetermined time range, and as such, the bearings are considered to be too tight for the system. The adjustment nut 272 would need to be loosened to place the bearings in the appropriate preload state.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method for setting bearings comprising the steps of:
   setting a bearing set on a shaft;
   positioning an inertia wheel on the shaft;
   rotating the inertia wheel;
   measuring a first rotational speed at a first time
   waiting until the inertia wheel achieves a second rotational speed at a second time, the second speed being less than the first speed; and
   measuring a change in time between the first time and the second time; and
   adjusting the bearing setting if the change in time is outside a predetermined time range.

2. The method of claim 1, wherein the bearing set is one or more of angular contact bearings or tapered roller bearings.

3. The method of claim 1, wherein the step of rotating the inertia wheel further comprises rotating the inertial wheel to a rotational speed greater than the first rotational speed.

4. The method of claim 1, further comprising a speed sensor operably connected to a reference point, the method further comprising the step of sensing the rotational speed of the inertia wheel.

5. The method of claim 4, wherein the shaft is operably connected to a transmission, the reference point is one or more of the inertia wheel or a gear operably connected to the transmission.

6. The method of claim 1, wherein the predetermined time range comprises an upper limit and a lower limit, wherein if the change in time is greater than the upper limit, the bearing is in endplay.

7. The method of claim 6, wherein if the change in time is less than the lower limit, the bearing is in rolling drag.

8. The method of claim 6, further comprising an adjustment nut rotatably connected to the shaft, the method further comprising the steps of:
   tightening the adjustment nut if the change in time is greater than the upper limit of the predetermined range; and
   loosening the adjustment nut if the change in time is less than the lower limit of the predetermined range.

9. The method of claim 1, wherein if the change in time is within the predetermined range, the bearing set is in preload.

10. The method of claim 1, wherein the inertia wheel is less than twenty-five lbs.

11. The method of claim 1, wherein the inertia wheel diameter is between about 8 inches and about 14 inches.

12. The method of claim 1, wherein the shaft is disposed in a transmission of an agricultural tractor.

13. The method of claim 1, where the predetermined time range is between about 2 seconds to about 8 seconds.

14. The method of claim 1 wherein the first speed is about 70 revolutions per minute and the second speed is about 30 revolutions per minute.

15. A method for setting bearings comprising the steps of:
    setting a bearing set on a shaft of a transmission for an agricultural tractor;
    positioning an inertia wheel on the shaft;
    rotating the inertia wheel;
    measuring a first rotational speed at a first time
    waiting until the inertia wheel achieves a second rotational speed at a second time, the second speed being less than the first speed; and
    measuring a change in time between the first time and the second time; and adjusting the bearing setting if the change in time is outside a predetermined time range, the time range having an upper limit and a lower limit, wherein if the change in time is above the upper limit the bearing set is in end play, if the change in time is within the predetermined time range, the bearing set is in desired preload, and if the change in time is below the lower limit, the bearing set is too tight.

16. The method of claim 15, wherein the set of bearings are one or more of angular contact bearings or tapered roller bearings.

17. The method of claim 15, further comprising an adjustment nut rotatably connected to the shaft, the method further comprising the steps of:
   tightening the adjustment nut if the change in time is greater than the upper limit of the predetermined range; and
   loosening the adjustment nut if the change in time is less than the lower limit of the predetermined range.

18. The method of claim 17, repeatedly rotating the inertia wheel and obtaining change in time data and adjusting the adjustment nut until the change in time is within the predetermined range indicating a preload state for the bearing set.

19. The method of claim 15, further comprising a speed sensor operably connected to a reference point relative to the shaft.

* * * * *